US007301784B2

(12) United States Patent
Murakami et al.

(10) Patent No.: US 7,301,784 B2
(45) Date of Patent: Nov. 27, 2007

(54) LIGHTING CONTROL UNIT FOR VEHICLE LIGHTING FIXTURE

(75) Inventors: Kentarou Murakami, Shizuoka (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 125 days.

(21) Appl. No.: 11/346,675

(22) Filed: Feb. 3, 2006

(65) Prior Publication Data

US 2006/0175901 A1 Aug. 10, 2006

(30) Foreign Application Priority Data

Feb. 9, 2005 (JP) ............................ 2005-032436

(51) Int. Cl.
*H02M 3/335* (2006.01)
*H05B 37/02* (2006.01)
*G05F 1/40* (2006.01)

(52) U.S. Cl. .................................... 363/21.01; 315/291

(58) Field of Classification Search .................. 363/16, 363/20, 21.01, 21.04, 21.07, 21.09, 56.01, 363/95, 97, 131; 315/77, 121, 122, 127, 315/195, 201, 202, 210–212, 214, 217, 219, 315/221, 291, 294, 308, 313–315
See application file for complete search history.

(56) References Cited

U.S. PATENT DOCUMENTS 5,901,051 A * 5/1999 Takahashi et al. ....... 363/21.18
6,445,598 B1 * 9/2002 Yamada .................. 363/21.12
6,784,626 B2 * 8/2004 Otake et al. ................ 315/291
7,158,391 B2 * 1/2007 Hatakeyama ............ 363/21.01

FOREIGN PATENT DOCUMENTS

JP 20002-8409 1/2002

OTHER PUBLICATIONS

Patent Abstracts of Japan, Publication No.: 2002-008409, Publication Date: Jan. 11, 2002, 1 page.

* cited by examiner

*Primary Examiner*—Matthew V. Nguyen
(74) *Attorney, Agent, or Firm*—Osha•Liang LLP

(57) ABSTRACT

In a process where the energy accumulated in the transformer while a transistor is turned ON is emitted to an output circuit and an LED is illuminated with the emitted energy, a voltage generated across a resistor is monitored by a control circuit. When the current flowing through the transistor has reached a limit current value, the ON operation of the transistor is limited. When the output voltage of the output circuit has exceeded a first set voltage, the limit current value is lowered and the ON operation of the transistor is further limited. When the output voltage of the output circuit has exceeded a second set voltage, the ON operation of the transistor is forcibly stopped.

7 Claims, 5 Drawing Sheets

LIGHTING CONTROL UNIT FOR VEHICLE LIGHTING FIXTURE

CROSS-REFERENCE TO RELATED APPLICATIONS

This application is based upon and claims the benefit of priority from the prior Japanese Patent Applications No. 2005-032436, filed on Feb. 9, 2005, the entire contents of which are incorporated herein by reference.

BACKGROUND OF THE INVENTION

1. Field of the Invention

The present invention relates to a lighting control unit for a vehicle lighting fixture and in particular to a lighting control unit designed to control lighting of a semiconductor light source including a semiconductor light-emitting device.

2. Description of the Related Art

In the related art, a vehicle lighting fixture is known that uses a semiconductor light-emitting device such as an LED (Light Emitting Diode). This type of vehicle lighting fixture mounts a lighting control circuit for controlling lighting of an LED.

A lighting control circuit has been proposed in which for example a forward type switching regulator is used as a switching regulator to control lighting of an LED (refer to JP-A-2004-8409, page 4, FIG. 2). The forward type switching regulator has a transformer and a switching element connected to the primary side of the transformer. The forward type switching regulator is designed to emit electromagnetic energy accumulated on the primary side of the transformer while the switching element is ON to the secondary side of the transformer and supply the emitted electromagnetic energy to the LED via a rectifier circuit.

The maximum value of the switching regulator is determined by an input voltage as the battery voltage of a vehicle and the winding ratio of a transformer. For example, when the input voltage is 13V and the winding ratio of a transformer is 1:4, the output voltage is 13V×4=52V. The winding ratio of a transformer is set considering variations in the battery voltage. Since the battery voltage of a vehicle varies with engine operating state or load state. Thus, it is requested that an LED be illuminated despite variations in the range of 6 to 20V. As a result, when the forward voltage of the LED is about 30V, the winding ratio of the transformer should be 1:5 or over (6V×5=30V−(20V×5)=100V) in order to stably illuminate the LED. When the winding ratio of the transformer is set to 1:6 with some margin considered, the output voltage is 36V for an input voltage of 6V (6V×6=36V) thus stably illuminating the LED. When the battery voltage reaches 20V, the output voltage of the switching regulator reaches 20V×6=120V. A break of wire in the LED at this time elevates the output voltage of the switching regulator to 120V or more. This makes it necessary to use an LED with a pressure resistance that will not go faulty when the output voltage of the switching regulator exceeds 120V, which increases costs.

In order to prevent the increase in cost, it is possible to use a configuration where the output voltage of the switching regulator is monitored and the switching element is turned off when the output voltage of the switching regulator has exceeded a set voltage, for example 54V.

JP-A-2002-8409 (Page 4, FIG. 2) is referred to as a related art.

When too low a set voltage is specified in the configuration where the switching element is turned off when the output voltage of the switching regulator has exceeded the set voltage, variations in Vf (forward voltage) of an LED may result or the LED may fail to illuminate depending on the corresponding temperature characteristic. In particular, when an LED with a high Vf is used at low temperatures, it may cause the LED to illuminate despite a wire break, which will lower the system safety.

When too low a set voltage is specified to turn off the switching element, the transformer may be saturated in a process where the output voltage of the switching regulator rises.

A transformer used for a forward-type switching regulator has its primary side and secondary side generally coupled to each other while the switching element is turned on and a rise in the current flowing through the transformer is suppressed by the inductance of a coil inserted in the secondary side of the transformer. Thus, the transformer need not have a gap and coupling efficiency is upgraded by possibly eliminating a gap. When the coupling of the primary side and the secondary side is in good condition, there is no danger of magnetic saturation. When the secondary side of the transformer is open with the wire break in the LED, the transformer has no energy delivery port on the secondary side thus resulting in magnetic saturation at a lower current value caused by the absence of the gap unless the primary side and the secondary side are coupled again.

Immediately after the LED has encountered a wire break, the output voltage of the switching regulator is low so that the transformer can deliver its energy to a smoothing capacitor on the secondary side. In the process where the output voltage of the transformer rises in the absence of coupling of the primary side and the secondary side of the transformer, the primary side of the transformer merely serves as a coil with the absence of a gap, which results in magnetic saturation at a lower current value.

When magnetic saturation has taken place, the current flowing on the primary side of the transformer suddenly rises. This could damage the switching element without proper action being taken. In this case, to suppress magnetic saturation of the transformer, the set voltage may be set to a value considering variations in the Vf of the LED and temperature characteristic and the duty ratio of a switching signal applied to the switching element may be lowered with the rise in the output voltage of the switching regulator.

However, it is difficult to match the degree of lowering the duty ratio of the switching signal with the degree of magnetic saturation of the transformer. Too high a degree of lowering the duty ratio of the switching signal could result in variations in the Vf of the LED or the LED could fail to illuminate depending on the temperature characteristic. This could impair the safety of the system.

Another approach is to turn off the switching element to limit the current when the current flowing through the transformer has suddenly risen on occurrence of magnetic saturation. In the process, the energy of the current is applied to the switching element with the timing the switching element is turned off. The energy could damage the switching element when the switching element consumes the suddenly elevated current at the time of wire break, leading to power loss.

SUMMARY OF THE INVENTION

One or more embodiments of the invention alleviate magnetic saturation of a transformer when a semiconductor light source is faulty thus preventing damage to a circuit element.

In accordance with one or more embodiments, a first aspect of the invention provides a lighting control unit for a vehicle lighting fixture having: a switching regulator which converts an input voltage from a power supply to electromagnetic energy and emits the electromagnetic energy to a secondary side of a transformer, in accordance with an ON/OFF operation of a switching element connected to a primary side of the transformer; an energy propagation section which propagates electromagnetic energy emitted from the switching regulator as light emission energy to a semiconductor light source; a primary current detection section which detects a current on the primary side of the transformer; a secondary current detection section which detects a current supplied from the secondary side of the transformer to the semiconductor light source; a voltage detection section which detects a voltage applied to the semiconductor light source; and a control section which generates a switching signal based on the current detected by the secondary current detection section, and controls the ON/OFF operation of the switching element in accordance with the generated switching signal as well as limits an ON operation of the switching element when the current detected by the primary current detection section reaches a limit current value, wherein the control section lowers the limit current value when the voltage detected by the voltage detection section exceeds a first set voltage.

(Operation) In a process where light emission energy supplied from a switching regulator to a semiconductor light source, a current on the primary side of a transformer, a current supplied from the secondary side of the transformer to the semiconductor light source and a voltage applied to the semiconductor light source are respectively detected. ON/OFF operation of the switching element is controlled based on the current supplied to the semiconductor light source and a specified current is supplied to the semiconductor light source, causing the semiconductor light source to illuminate in a stable state. When the current on the primary side of the transformer has reached a limit current value for example with variations in the power voltage while the semiconductor light source is lighting, the ON operation of the switching element is limited and a rise in the current flowing on the primary side of the transformer is suppressed and lighting of the semiconductor light source is maintained. When the voltage applied to the semiconductor light source has risen and exceeded a first set voltage with a fault in the semiconductor light source, the ON operation of the switching element is immediately limited with a drop in the limit current value thus alleviating magnetic saturation of the transformer. This suppresses a sudden rise in the output voltage of the switching regulator and prevents damage to the circuit element.

In accordance with one or more embodiments, a second aspect of the invention provides a lighting control unit for a vehicle lighting fixture having: a switching regulator which converts an input voltage from a power supply to electromagnetic energy and emits the electromagnetic energy to a secondary side of a transformer, in accordance with an ON/OFF operation of a switching element connected to a primary side of the transformer; a plurality of energy propagation sections which propagate electromagnetic energy emitted from the switching regulator as light emission energy to a plurality of semiconductor light emitting sources; a primary current detection section which detects a current on the primary side of the transformer; a secondary current detection section which detects a current supplied from the secondary side of the transformer to any one of the plurality of semiconductor light sources; a voltage detection section which detects a voltage applied to at least any one of the plurality of semiconductor light sources; and a control section which generates a switching signal based on the current detected by the secondary current detection section, and controls the ON/OFF operation of the switching element in accordance with the generated switching signal as well as limits an ON operation of the switching element when the current detected by the primary current detection section reaches a limit current value, wherein the control section lowers the limit current value when the voltage detected by the voltage detection section exceeds a first set voltage.

(Operation) In a process where light emission energy supplied from a switching regulator to each semiconductor light source, a current on the primary side of a transformer, a current supplied from the secondary side of the transformer to any one of the semiconductor light sources and a voltage applied to any one of the semiconductor light sources are respectively detected. ON/OFF operation of the switching element is controlled based on the current supplied to the semiconductor light source and a specified current is supplied to each semiconductor light source, causing each semiconductor light source to illuminate in a stable state. When the current on the primary side of the transformer has reached a limit current value for example with variations in the power voltage while each semiconductor light source is lighting, the ON operation of the switching element is limited and a rise in the current flowing on the primary side of the transformer is suppressed and lighting of each semiconductor light source is maintained. When the voltage applied to the semiconductor light source has risen and exceeded a first set voltage with a fault in any one of the semiconductor light sources, the ON operation of the switching element is immediately limited with a drop in the limit current value thus alleviating magnetic saturation of the transformer. This suppresses a sudden rise in the output voltage of the switching regulator and prevents damage to the circuit element.

In accordance with one or more embodiments, a third aspect of the invention provides the lighting control unit for a vehicle lighting fixture according to the first or second aspect, wherein the control section forcibly stops the ON operation of the switching element when the voltage detected by the voltage detection section exceeds a second set voltage that is higher than the first set voltage.

(Operation) By forcibly stopping the ON operation of the switching element when the voltage applied to a semiconductor light source has exceeded the second set voltage that is higher than the first set voltage, it is possible to reliably prevent damage to the circuit element.

As understood from the foregoing description, according to the lighting control unit for a vehicle lighting fixture of claim 1, it is possible to suppress a sudden rise in the output voltage of the switching regulator with a fault in a semiconductor light source, thus prevent damage to the circuit element.

According to the lighting control unit for a vehicle lighting fixture of claim 2, it is possible to suppress a sudden rise in the output voltage of the switching regulator with a fault in a semiconductor light source, thus prevent damage to the circuit element even in case a plurality of semiconductor light sources are provided.

According to the third aspect of the invention, it is possible to reliably prevent damage to the circuit element.

DETAILED DESCRIPTION OF THE PREFERRED EMBODIMENTS

Figure 1:
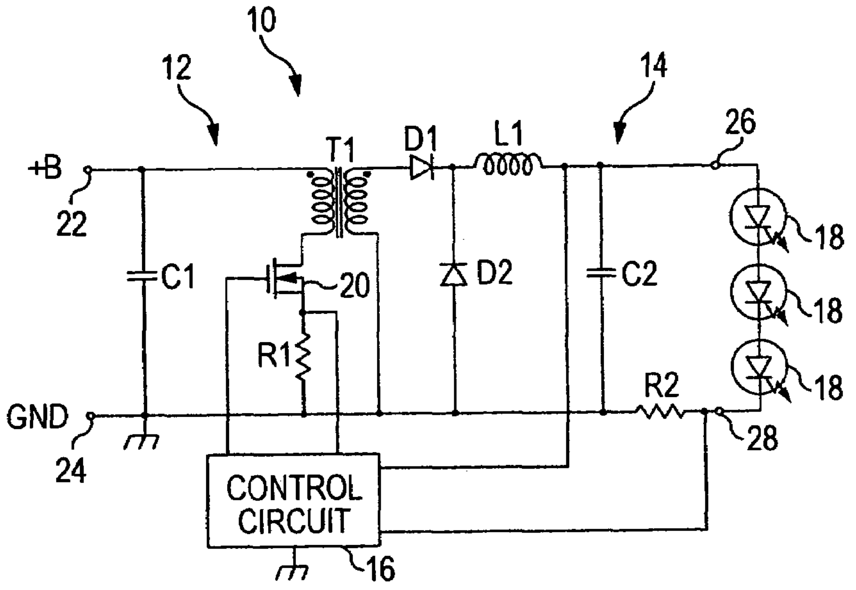
FIG. 1 is a block diagram of a lighting control unit for a vehicle lighting fixture showing a first embodiment of the invention.
Figure 2:
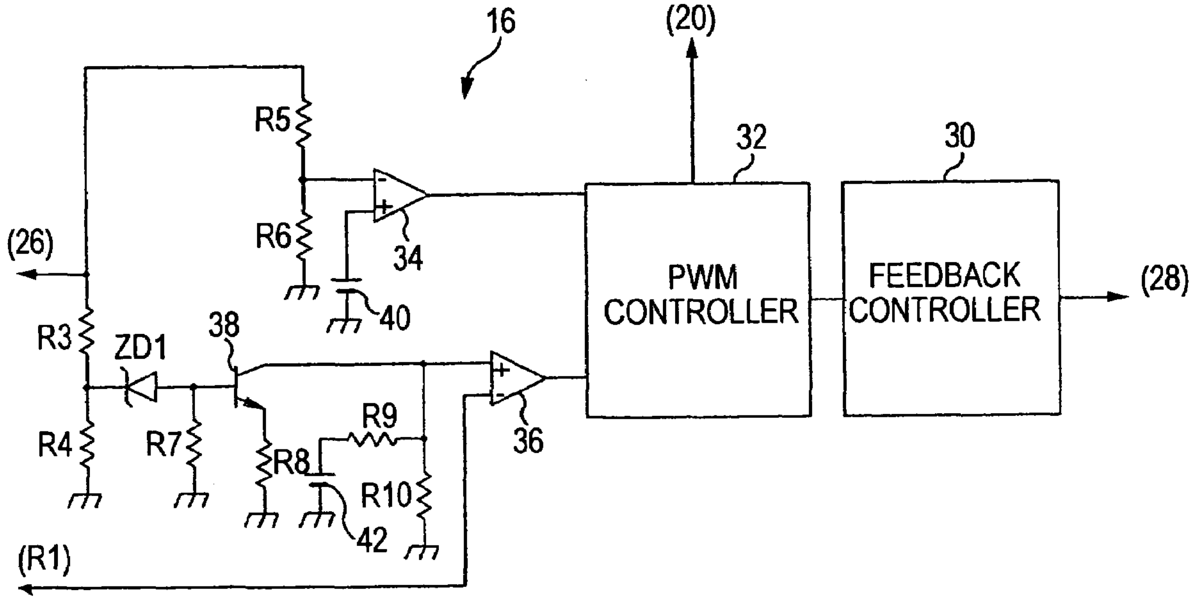
FIG. 2 is a circuit block diagram showing a first embodiment of a control circuit.
Figure 3:
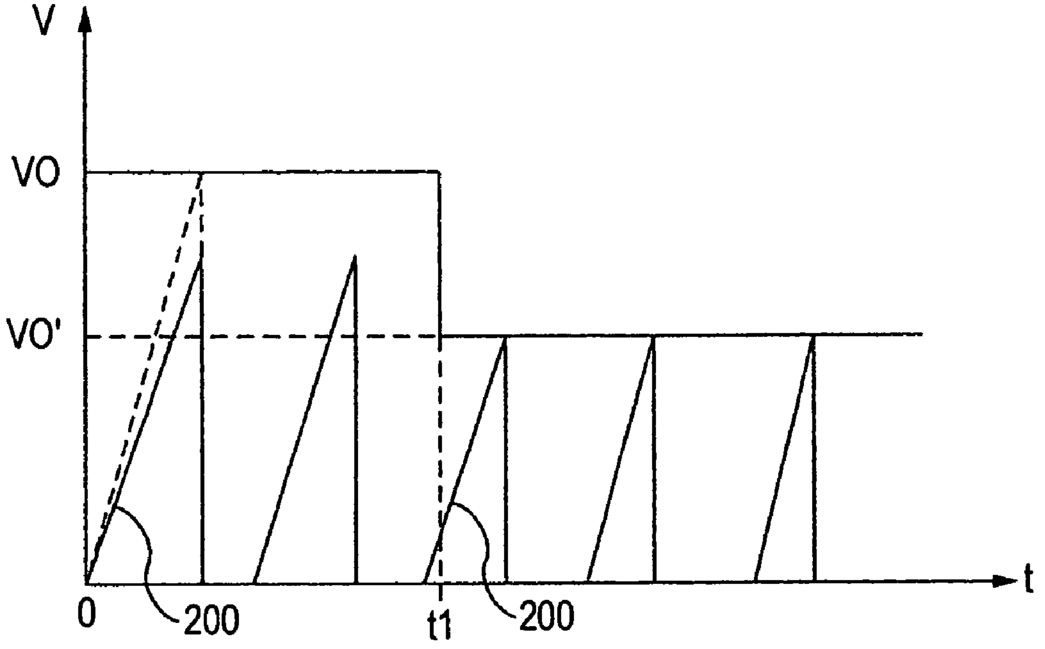
FIG. 3 is a waveform diagram illustrating the operation of the control circuit of the first embodiment.
Figure 4:
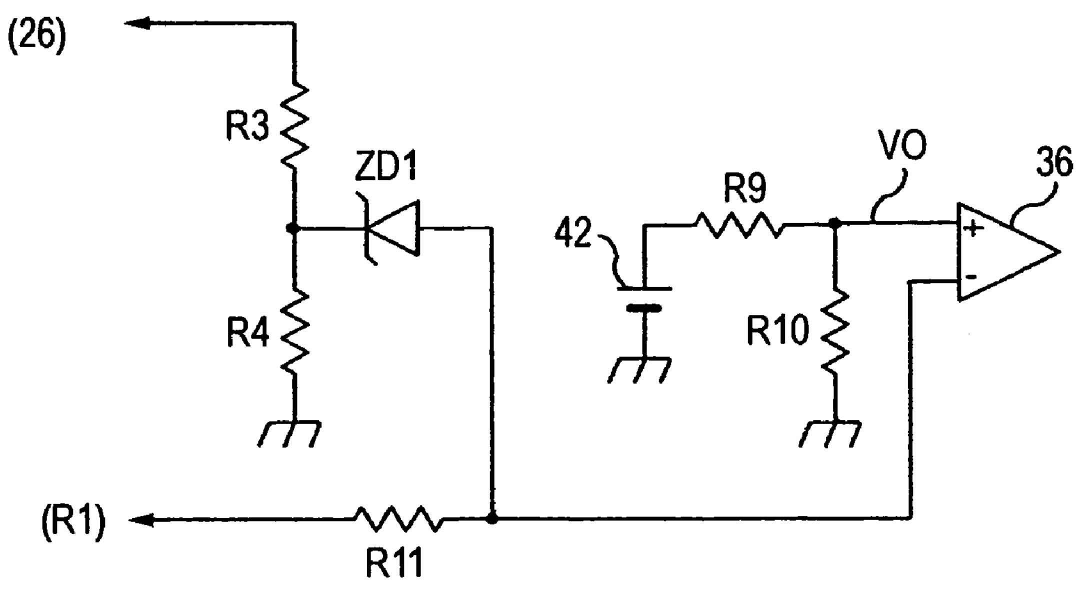
FIG. 4 is a circuit block diagram showing a second embodiment of the control circuit.
Figure 5:
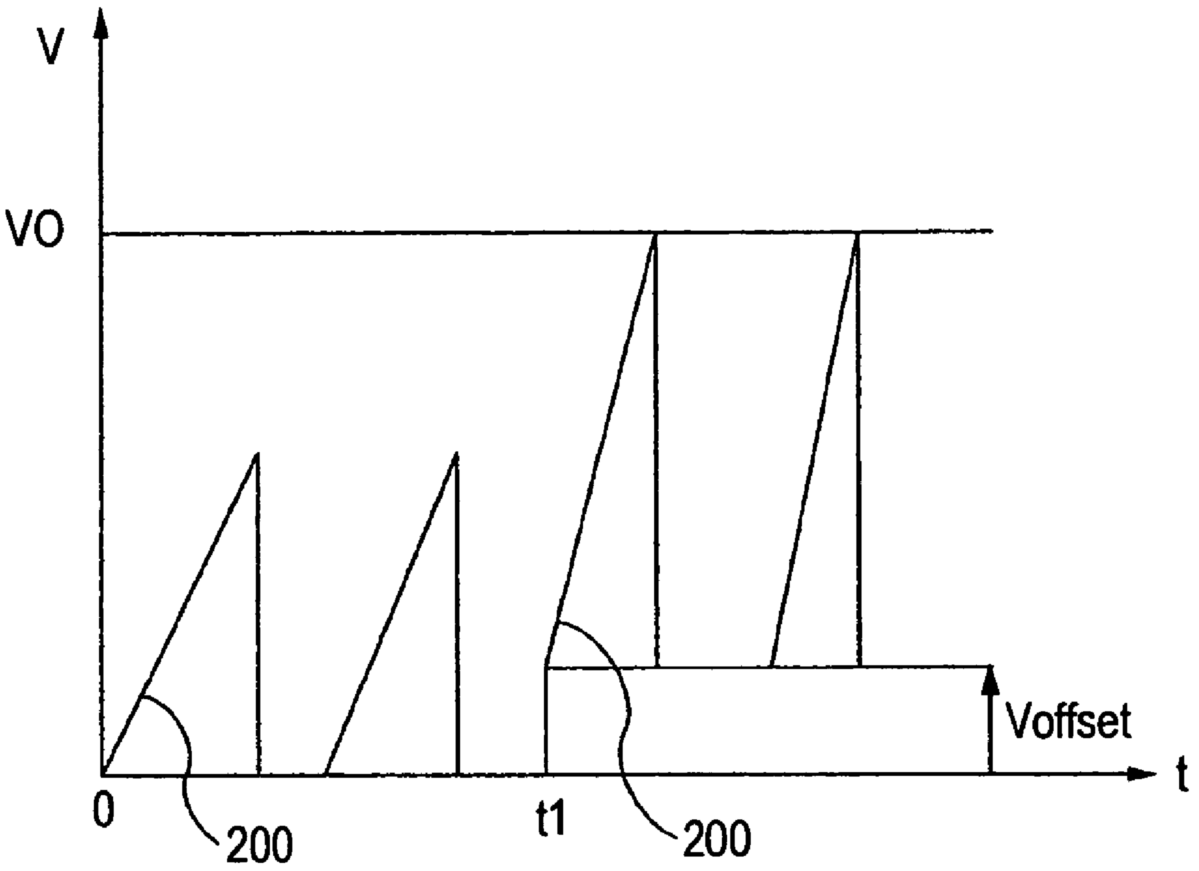
FIG. 5 is a waveform diagram illustrating the operation of the control circuit of the second embodiment.
Figure 6:
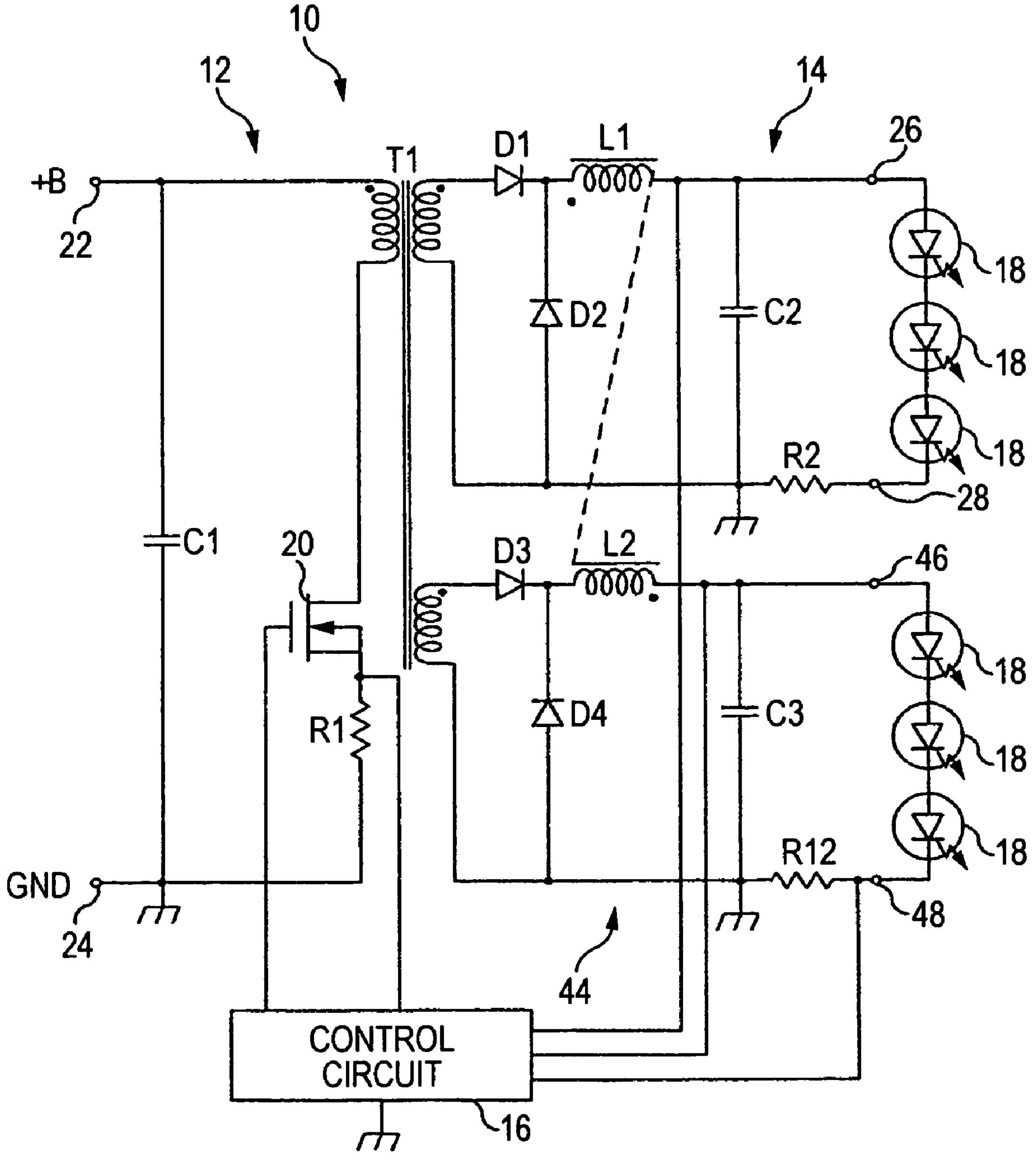
FIG. 6 is a block diagram of the lighting control unit for a vehicle lighting fixture showing a second embodiment of the invention.
Figure 7:
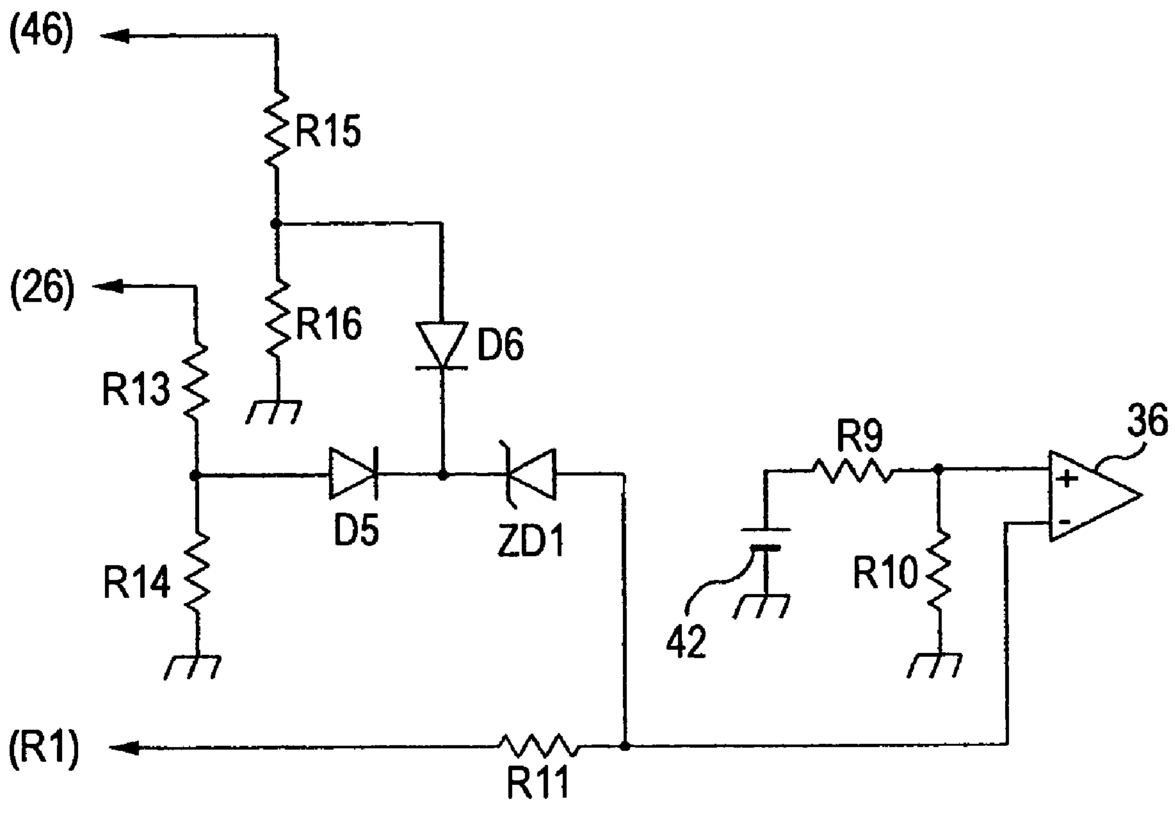
FIG. 7 is a circuit block diagram showing a third embodiment of the control circuit.

Next, embodiments of the invention will be described by way of examples with reference to the figures. FIG. 1 is a block diagram of a lighting control unit for a vehicle lighting fixture showing a first embodiment of the invention. FIG. 2 is a circuit block diagram showing a first embodiment of a control circuit. FIG. 3 is a waveform diagram illustrating the operation of the control circuit of the first embodiment. FIG. 4 is a circuit block diagram showing a second embodiment of the control circuit. FIG. 5 is a waveform diagram illustrating the operation of the control circuit of the second embodiment. FIG. 6 is a block diagram of the lighting control unit for a vehicle lighting fixture showing a second embodiment of the invention. FIG. 7 is a circuit block diagram showing a third embodiment of the control circuit.

As shown in FIG. 1, a lighting control unit for a vehicle lighting fixture 10 has, as one component of a vehicle lighting fixture, a forward type switching regulator 12, an output circuit 12 and a control circuit 16. To the output of the output circuit 16 three LEDs 18 are connected as a semiconductor light source composed of a semiconductor light emitting element. The LED 18 may be configured as a light source for various types of vehicle lighting fixtures including a headlamp, stop and tail lamps, a fog lamp, and a turn signal lamp. A single LED 18 may be used or a plurality of directly connected LEDs may be used as a single light source block. Or, a plurality of light source blocks connected in parallel may be used.

The forward type switching regulator 12 has a capacitor C1, a transformer (forward transformer) T1, an NMOS transistor 20, and a resistor R1. One end of the transformer is connected to an input terminal 22. The other end is connected to an input terminal 24 via the NMOS transistor 20 and the resistor R1. The input terminal 22 is connected to the positive terminal of a vehicle battery (DC power supply) and the input terminal 24 is connected to the negative terminal of vehicle battery and is grounded. The NMOS transistor 20 has a drain connected to the primary side of the transformer T1, a source connected to the resistor R, and a gate connected to the control circuit 16. The NMOS transistor 20 is designed to be turned ON/OFF in response to a switching signal (pulse signal) output from the control circuit 16. When the NMOS transistor is turned ON/OFF, an input voltage from a car-mounted battery is converted to electromagnetic energy which is then emitted from the secondary side of the transformer T1. There is no gap between the primary side and the secondary side of the transformer T1. When the NMOS transistor is turned ON/OFF, the primary side and the secondary side are coupled to each other and electromagnetic energy accumulated in the transformer T1 is emitted from the secondary side of the transformer T1 to the output circuit 14.

The resistor R1 is configured as a primary current detection means for detecting a current flowing on the primary side of the transformer T1, that is, a current flowing through the NMOS transistor 20. A voltage generated across the resistor R1 is input to the control circuit 16. Instead of detecting a voltage generated across the resistor R1, it is possible to input the drain voltage of the NMOS transistor 20 into the control circuit 16 and detect a primary current using the on-state resistance of the NMOS transistor 20.

The output circuit 14 that serves as rectifying/smoothing section has diodes D1, D2, a coli L1, a capacitor C2, and a resistor R2. The anode of the diode D1 is connected to the secondary side of the transformer T1. The joint of the coil L1 and the capacitor C2 is connected to an output terminal 26. One end of the resistor R2 is connected to an output terminal 28 and the other end of the resistor R2 is grounded. To the output terminal 26, 28 are respectively connected one end and the other end of the LEDs connected in series.

The diodes D1, D2, the coil L1 and the capacitor C2 is configured as an energy propagation section for propagating as light emission energy the electromagnetic energy emitted from the secondary side of the transformer T1. The diodes D1, D2 are configured as a rectifying section for rectifying a current output from the secondary side of the transformer T1. The coil L1 and the capacitor C2 are configured as a smoothing section for smoothing the rectified current. The resistor R2 is configured as a secondary current detection section for detecting a current supplied from the secondary side of the transformer T1 to the LED 18, that is, a current flowing through the LED 18 so as to allow a voltage across the resistor R2 to be input to the control circuit 12.

As shown in FIG. 2, the control circuit 16 has a feedback controller 30, a PWM (Pulse Width Modulation) controller 32, comparators 34, 36, an NPN transistor 38, reference voltages 40, 42, resistors R3, R4, R5, R6, R7, R8, R9, R10, and a Zener diode ZD1. The control circuit 16 extracts a voltage across the resistor R1, a voltage across the resistor R2 and a voltage applied to the output terminal 26 (output voltage of the switching regulator 12), generates a PWM signal as a switching signal based on the voltage across the resistor R2 (a current flowing through the LED 18), and controls the ON/OFF operation of the NMOS transistor 20 as well as limits the ON operation of the NMOS transistor 20 when the current flowing through the transformer T1 has reached a limit current value, lowers the limit current value when the output voltage of the switching regulator 12 has exceeded a first set voltage, and forcibly stops the ON operation of the NMOS transistor 20 when the output voltage of the switching regulator 12 has exceeded a second set voltage that is higher than the first set voltage.

In particular, the feedback controller 30 extracts the voltage across the resistor R2, performs feedback control arithmetic operation for setting the current flowing through the LED 18 to a prespecified current, for example a rated current, and outputs the result of the arithmetic operation to the PWM controller 32. The PWM controller 31 generates a PWM signal based on the result of the arithmetic operation of the feedback controller 30 and outputs the generated PWM signal to the gate of the NMOS transistor 20 in order to control the ON/OFF operation of the NMOS transistor. In other words, the feedback controller 30 turns ON/OFF the NMOS transistor 20 in accordance with a PWM signal and supplies a constant current from the switching regulator 12 to the LED 18 via the output circuit 14.

In the control circuit 32, a voltage 200 across the resistor R1 is applied to the negative terminal of a comparator 36 in order to monitor the current flowing on the primary side of the transformer T1, as shown in FIG. 3. To the positive terminal is applied a reference voltage V0 obtained by dividing the output voltage of a reference voltage 42 with a resistor R9 and a resistor R10. The reference voltage V0 is set in correspondence with the limit current value.

The comparator 36 makes comparison between a voltage applied to the negative input terminal (voltage corresponding to the current on the primary side of the transformer T1) and the reference voltage V0 applied to the positive input terminal (voltage corresponding to the limit current value) and outputs a High Level signal to the PWM controller 32 when the voltage at the positive input terminal is higher than the voltage at the negative input terminal, that is, when the current flowing on the primary side of the transformer T1 has not reached the limit current value. When a High Level signal is output from the comparator 36, the PWM controller 32 outputs the generated PWM signal to the gate of the NMOS transistor 20.

When the current flowing on the primary side of the transformer T1 rises with variations in the power supply voltage and the level of the voltage 200 applied to the negative input terminal of the comparator 36 has reached the reference voltage V0, the output of the comparator 36 is inverted from a high level to a low level and a PWM signal to turn OFF the NMOS transistor 20 is generated in the PWM controller 32 so as to limit the ON operation of the NMOS transistor 20. That is, when a Low Level signal is output from the comparator 36, the on-duty of the PWM signal is reduced (duty ratio is decreased) so as to limit the ON operation of the NMOS transistor 20.

The resistors R3, R4 serving as a component of voltage detection section for detecting a voltage applied to each LED 18 divides the output voltage of the output circuit 12 and applies the voltage thus obtained to the cathode of the Zener diode ZD1. The Zener voltage of the Zener diode ZD1 is set to for example 40V as a first set voltage when the voltage of the output circuit 14 is set to 30V. When the voltage of the output circuit 14 rises with a wire break in the LED 18 and the output voltage of the output circuit 14 exceeds the Zener voltage of the Zener diode ZD1, the NPN transistor is turned on and a reference voltage V0' that is lower than the reference voltage V0 is applied to the positive input terminal of the comparator 36.

In other words, to decrease the limit current value, the reference voltage V0 applied to the positive input terminal of the comparator 36 drops to V0'. As a result, in a process where the current flowing on the primary side of the transformer T1 increases, the output of the comparator 36 is driven Low each time the voltage 200 across the resistor R1 reaches the reference voltage V0'. To limit the ON operation of the NMOS transistor 20, the NMOS transistor 20 is immediately turned off. This alleviates magnetic saturation of the transformer T1 and suppresses an increase in the current flowing on the primary side of the transformer T1 as well as a sudden rise in the voltage on the secondary side of the transformer T1, thereby preventing damage to a circuit element such as the NMOS transistor 20.

Simply limiting the current flowing on the primary side of the transformer T1 causes a gradual increase in the output voltage of the transformer T1, which results in an output overvoltage of the output circuit 14. To prevent this from happening, the output voltage of the output circuit 14 is monitored by the comparator 34 in the control circuit 16.

The output voltage of the reference voltage 40 is applied as a second set voltage to the positive input terminal of the comparator 34. A voltage obtained by dividing the output voltage of the output circuit 14 with the resistor R5 and the resistor R6 is applied to the negative input terminal. The resistors R5, R6 are configured as a voltage detection section for detecting a voltage applied to the LED 18.

The comparator 34 outputs a High Level signal to the PWM controller 32 when the voltage at the positive input terminal is higher than the voltage at the negative input terminal. In this case, the PWM 32 outputs the generated PWM signal to the NMOS transistor 20 without responding to the output of the comparator 34. When the voltage at the negative input terminal of the comparator 34 exceeds the voltage at the negative input terminal, the output of the comparator 34 s inverted from a high level to a low level and generation of the PWM signal is stopped by the PWM controller 32, with the NMOS transistor 20 immediately being turned off and stopping operation. As a result, it is possible to prevent the output voltage of the output circuit 14 from exceeding the second set voltage, for example 54V, thereby reliably preventing damage to a circuit element of the output circuit 14 or the LED 18.

According to this embodiment, the limit current value is lowered to alleviate magnetic saturation of the transformer T1 when the voltage of the output circuit 14 has risen with a wire break in the LED 18 and the output voltage of the output circuit 14 has exceeded the first set voltage. It is thus possible to suppress an increase in the current flowing on the primary side of the transformer T1 as well as a sudden rise in the voltage on the secondary side of the transformer T1, thereby preventing damage to a circuit element such as the NMOS transistor 20. Further, according to this embodiment, the NMOS transistor is immediately shut down when the output voltage of the output circuit 14 has exceeded the second set voltage. It is thus possible to reliably prevent damage to a circuit element of the output circuit 14 or the LED 18.

In this embodiment, the reference voltage V0 is lowered to V0' in order to lower the limit current value when the output voltage of the output circuit 14 has exceeded the first set voltage. As shown in FIG. 4, it is also possible to divide the output voltage of the output circuit 14 with the resistors R3, R4, input the voltage thus obtained to the negative input terminal of the comparator 36 via the Zener diode ZD1, input the voltage across the resistor R1 to the negative input terminal of the comparator 36 via a resistor R11, and apply to the positive input terminal of the comparator 36 the voltage obtained by dividing the output voltage of the reference voltage 42 with the resistor R9 and the resistor R10.

In this case, as shown in FIG. 5, when the output voltage of the output circuit 14 has exceeded the first set voltage with a timing t1, the Zener voltage of the Zener diode ZD1 is added as an offset voltage Voffset to the negative input terminal of the comparator 36. By elevating the level of the voltage 200 across the resistor R1 with the offset voltage Voffset, it is possible to limit the current flowing on the primary side of the transformer T1, similar to a case where the reference voltage V0 is lowered to V0' to lower the limit current value.

Next, a second embodiment of the invention will be described referring to FIGS. 6 and 7. This embodiment provides an output circuit 44 on the secondary side of the transformer on top of the output circuit 14 in order to provide a multi-output switching regulator 12. The configuration of this embodiment is the same as that shown in FIG. 1 except that the control circuit 16 is partially different.

The output circuit 44 has diodes D3, D4, a coil L2, a capacitor C3 and a resistor R12. The anode of the diode D3 is connected to the secondary side of the transformer T1. The coil L2 is magnetically coupled with a coil L1. One end of the coil L2 is connected to an output terminal 46. One end of the resistor R12 is connected to an output terminal 48. Between the output terminals 46 and 48 are connected three LEDs 18 in series.

As shown in FIG. 7, the control circuit 16 has, on top of a feedback controller 30, a PWM controller 32, a comparator 34, resistors R5, R6 and a reference voltage 40, a comparator 36, a reference voltage 42, resistors R9, R10, R11, R13, R14, R15, R16, a Zener diode ZD1, and diodes D5, D6. The resistors 13, 14 divide the voltage applied to an output terminal 26 and output the voltage thus obtained to the cathode of the Zener diode ZD1 via the diode D5. The resistors R15, R16 divide the voltage applied to the output terminal 46 of the output circuit 44 and output the voltage thus obtained to the cathode of the Zener diode ZD1 via the diode D6. That is, D5 and D6 are connected to each other by way of wired OR connection and connected to the cathode of the Zener diode ZD1. When the voltage applied to the output terminals 24, 46 has exceeded the Zener voltage of the Zener diode ZD1, the Zener voltage is applied to the negative input terminal of the comparator 36. In this case, the Zener voltage as well as the voltage across the resistor R1 is input to the negative input terminal of the comparator 36. Similar to the case shown in FIG. 4, by elevating the level of the voltage 200 across the resistor R1, it is possible to limit the current flowing on the primary side of the transformer T1.

According to this embodiment, the limit current value is lowered to alleviate magnetic saturation of the transformer T1 when the output voltage of any one of the output circuits 14 and 44 has risen with a wire break in the LED 18 and the output voltage has exceeded the first set voltage. It is thus possible to suppress an increase in the current flowing on the primary side of the transformer T1 as well as a sudden rise in the voltage on the secondary side of the transformer T1, thereby preventing damage to a circuit element such as the NMOS transistor 20. Further, according to this embodiment, the NMOS transistor is immediately shut down when the output voltage of any one of the output circuits 14 and 44 has exceeded the second set voltage. It is thus possible to reliably prevent damage to a circuit element of the output circuit 14 or the LED 18.

According to this embodiment, a current having the current ratio corresponding to the winding ratio of the coil L1 to the coil L2 is supplied from the output circuits 14, 44 to the LED 18. It is thus possible to arbitrarily set a current flowing through the LED 18 as a load on the output circuit 14 and a current flowing through the LED 18 as a load on the output circuit 44 using the winding ratio of the coil L1 to the coil L2.

While the voltages respectively applied to the output terminal 26, 46 are applied to the Zener diode ZD1 via the diodes D5, D6, it is possible to use a simple configuration where only the voltage of one output circuit 14 or 44 that requires more attention is applied to the cathode of the Zener diode ZD1.

What is claimed is:

1. A lighting control unit for a vehicle lighting fixture, comprising:

a switching regulator which converts an input voltage from a power supply to electromagnetic energy and emits the electromagnetic energy to a secondary side of a transformer, in accordance with an ON/OFF operation of a switching element connected to a primary side of the transformer;

an energy propagation section which propagates electromagnetic energy emitted from the switching regulator as light emission energy to a semiconductor light source;

a primary current detection section which detects a current on the primary side of the transformer;

a secondary current detection section which detects a current supplied from the secondary side of the transformer to the semiconductor light source;

a voltage detection section which detects a voltage applied to the semiconductor light source; and a control section which generates a switching signal based on the current detected by the secondary current detection section, and controls the ON/OFF operation of the switching element in accordance with the generated switching signal as well as limits an ON operation of the switching element when the current detected by the primary current detection section reaches a limit current value, wherein the control section lowers the limit current value when the voltage detected by the voltage detection section exceeds a first set voltage.

2. A lighting control unit for a vehicle lighting fixture, comprising:

a switching regulator which converts an input voltage from a power supply to electromagnetic energy and emits the electromagnetic energy to a secondary side of a transformer, in accordance with an ON/OFF operation of a switching element connected to a primary side of the transformer;

a plurality of energy propagation sections which propagate electromagnetic energy emitted from the switching regulator as light emission energy to a plurality of semiconductor light emitting sources;

a primary current detection section which detects a current on the primary side of the transformer;

a secondary current detection section which detects a current supplied from the secondary side of the transformer to any one of the plurality of semiconductor light sources;

a voltage detection section which detects a voltage applied to at least any one of the plurality of semiconductor light sources; and a control section which generates a switching signal based on the current detected by the secondary current detection section, and controls the ON/OFF operation of the switching element in accordance with the generated switching signal as well as limits an ON operation of the switching element when the current detected by the primary current detection section reaches a limit current value, wherein the control section lowers the limit current value when the voltage detected by the voltage detection section exceeds a first set voltage.

3. The lighting control unit for a vehicle lighting fixture according to claim 1, wherein the control section forcibly stops the ON operation of the switching element when the voltage detected by the voltage detection section exceeds a second set voltage that is higher than the first set voltage.

4. The lighting control unit for a vehicle lighting fixture according to claim 2, wherein the control section forcibly stops the ON operation of the switching element when the voltage detected by the voltage detection section exceeds a second set voltage that is higher than the first set voltage.

5. The lighting control unit for a vehicle lighting fixture according to claim 1, wherein the switching regulator is a forward type switching regulator, and the energy propagation section includes a plurality of diodes which are configured as a rectifying section, and a coil and a capacitor which are configured as a smoothing section.

6. The lighting control unit for a vehicle lighting fixture according to claim 2, wherein the switching regulator is a forward type switching regulator, and each of the plurality of energy propagation sections includes a plurality of diodes which are configured as a rectifying section, and a coil and a capacitor which are configured as a smoothing section.

7. The lighting control unit for a vehicle lighting fixture according to claim 6, wherein the coils of the plurality of energy propagation sections are magnetically coupled with each other.

* * * * *